United States Patent
Ito

(10) Patent No.: US 10,253,160 B2
(45) Date of Patent: Apr. 9, 2019

(54) POLYACETAL STRETCHED FIBER

(71) Applicant: MITSUBISHI GAS CHEMICAL COMPANY, INC., Tokyo (JP)

(72) Inventor: Akira Ito, Mie (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 451 days.

(21) Appl. No.: 14/430,030

(22) PCT Filed: Sep. 3, 2013

(86) PCT No.: PCT/JP2013/073593
§ 371 (c)(1),
(2) Date: Mar. 20, 2015

(87) PCT Pub. No.: WO2014/050448
PCT Pub. Date: Apr. 3, 2014

(65) Prior Publication Data
US 2015/0225536 A1 Aug. 13, 2015

(30) Foreign Application Priority Data
Sep. 26, 2012 (JP) ................................. 2012-212274

(51) Int. Cl.
| C08K 5/098 | (2006.01) |
| D01D 5/098 | (2006.01) |
| D01F 6/58 | (2006.01) |
| D01F 6/66 | (2006.01) |
| D01F 1/10 | (2006.01) |
| C08L 59/04 | (2006.01) |

(52) U.S. Cl.
CPC .............. *C08K 5/098* (2013.01); *C08L 59/04* (2013.01); *D01D 5/098* (2013.01); *D01F 1/10* (2013.01); *D01F 6/58* (2013.01); *D01F 6/66* (2013.01); *D10B 2331/30* (2013.01); *Y10T 442/10* (2015.04); *Y10T 442/3171* (2015.04); *Y10T 442/444* (2015.04); *Y10T 442/642* (2015.04)

(58) Field of Classification Search
CPC ......... C08K 5/098; C08L 59/04; D01D 5/098; D01F 1/10; D01F 6/66; D01F 6/58; D01F 1/00; Y10T 442/10; Y10T 442/3171; Y10T 442/444; Y10T 442/642; Y10T 442/44; Y10T 428/2913; Y10T 428/2967; D04H 3/00; D04H 3/03; D04H 3/16; D04H 3/007; D04H 3/033
USPC .... 524/394, 399, 400; 442/1, 202, 311, 365; 264/103, 210.9, 210.8, 210.7, 211, 14; 428/364, 394
See application file for complete search history.

(56) References Cited

U.S. PATENT DOCUMENTS

| 3,536,673 A | * | 10/1970 | Parrini | .................... C08L 23/02 264/210.8 |
| 3,608,044 A | * | 9/1971 | Coplan | ..................... D01F 6/66 264/210.7 |
| 5,191,006 A | * | 3/1993 | Matsumoto | ............ C08K 5/098 524/310 |
| 5,306,772 A | * | 4/1994 | Mimura | .................. C08L 59/00 525/154 |
| 8,178,627 B2 | | 5/2012 | Okamura et al. | |
| 2004/0175566 A1 | | 9/2004 | Kikutani et al. | |
| 2005/0131198 A1 | | 6/2005 | Okawa | |
| 2010/0015458 A1 | | 1/2010 | Okamura et al. | |

FOREIGN PATENT DOCUMENTS

| GB | 966487 | 8/1964 |
| JP | 43-006101 | 3/1968 |
| JP | 60-052618 | 3/1985 |
| JP | 11-293523 | 10/1999 |
| JP | 2001-172821 | 6/2001 |
| JP | 2002-105756 | 4/2002 |
| JP | 2002-146637 | 5/2002 |
| JP | 2003-89925 | 3/2003 |
| JP | 2004-181718 | 7/2004 |
| JP | 2005-256189 | 9/2005 |
| JP | 2006-009196 | 1/2006 |
| JP | 2008-308791 | * 12/2008 |
| WO | 2008/069184 | 6/2008 |

OTHER PUBLICATIONS

Hidetoshi Okawa, "Duracon Fiber", (Fibers and Industries), The Society of Fiber Science and Technology, 2009, pp. 134-137, vol. 65, No. 4.
Search report from PCT/JP2013/073593, dated Nov. 12, 2013.
European Search Report issued in Patent Application No. 13841353. 9, dated Mar. 24, 2016.
Japanese Office Action issued in Counterpart Patent Appl. No. 2014-538315, dated Feb. 21, 2017, along with an english translation thereof.
Japanese Office Action issued in Counterpart Patent Appl. No. 2014-538315, dated Aug. 10, 2017, along with an english translation thereof.

* cited by examiner

*Primary Examiner* — Camie S Thompson
(74) *Attorney, Agent, or Firm* — Greenblum & Bernstein, P.L.C.

(57) ABSTRACT

The present invention is directed to a polyacetal stretched fiber of a polyacetal resin composition which contains a polyacetal resin and a fatty acid metal salt in an amount of 0.01 to 5 phr relative to the polyacetal resin, wherein the stretched fiber is obtained by stretching a fiber at a temperature of 100° C. or more to a temperature lower than the melting point of a polyacetal resin composition, and the fiber is obtained by melt spinning the polyacetal resin composition, and a fiber assembly comprising the stretched fiber as a main constituent.

16 Claims, No Drawings

POLYACETAL STRETCHED FIBER

FIELD OF THE INVENTION

The present invention relates to a stretched fiber of polyacetal resin and a fiber assembly comprising the same.

BACKGROUND ART

Polyacetal resins, which are engineering plastics, have excellent mechanical property, sliding property, frictional and wearing properties, chemical resistance and the like, and have been widely used in basic parts for automobiles, OA machines and the like. A polyacetal resin exhibits highly crystalline properties due to the regular primary structure thereof, and the application of the polyacetal resin is expanding mainly in the field of injection molding. In recent years, attempts are made to apply the polyacetal resin having the above-mentioned excellent properties to an extrusion use, particularly to fiber and film uses.

In plastic fibers and fiber assemblies comprising the same, conventionally, nylon and polyester have been mainly used. Particularly, in the field where a chemical resistance and a sliding property are required, fluororesin fibers have been used. However, nylon and polyester are not satisfactory in their sliding properties, and hence are desired to be further improved in the sliding properties. On the other hand, a fluororesin is an expensive material, and further has low aggregate force between molecules such that the molecular chains of fluororesin are unlikely to undergo orientation in spinning or stretching, so that it is difficult to obtain a fluororesin fiber having a practical mechanical strength. Thus, the fluororesin fiber does not satisfy both the required physical properties and the cost of production.

With respect to the polyacetal resin having excellent sliding property, frictional and wearing properties, and chemical resistance, like conventional general synthetic fibers, the production of a polyacetal resin fiber is attempted, and high sliding property and frictional and wearing properties of the polyacetal resin in a fiber form, which are comparable to the bulk property of the polyacetal resin, have been confirmed (for example, patent document 1 and non-patent document 1). Patent document 2 discloses stearic acid lubricants, and, as modifiers, polyethylene glycol, polypropylene glycol, polytetramethylene glycol, glycerol, a silicone oil, a fatty acid amide, and a fatty acid ester, and has a description showing that, by adding to a polyacetal resin a lubricant or a modifier in an appropriate amount, the polyacetal resin is increased in fluidity, so that the stringiness of the resin upon melt spinning is improved.

PRIOR ART REFERENCES

Patent Documents

Patent document 1: Japanese Unexamined Patent Publication No. 2003-089925
Patent document 2: Japanese Unexamined Patent Publication No. 2002-105756

Non-Patent Document

Non-patent document 1: Hidetoshi Okawa, "DURACON Fiber", Seni to Kogyo (Fibers and Industries), The Society of Fiber Science and Technology, Japan, 2009, Vol. 65, No. 4, pp. 134-137

DISCLOSURE OF THE INVENTION

Problems to be Solved by the Invention

However, it is relatively difficult to process the polyacetal resin into a fiber, and fiber products formed from the polyacetal resin cannot satisfy requirements, such as higher sliding property and the like. Further, the polyacetal fiber disclosed in patent document 2 is intended mainly to be obtained by spinning or stringing the polyacetal resin in a molten state at the melting point or more, and hence the fiber does not have a practical tensile strength. Accordingly, an object of the present invention is to provide a polyacetal stretched fiber having a mechanical strength, particularly a practical tensile strength, and an excellent processability in, for example, a stretching step, and an excellent sliding property, and a fiber assembly comprising the stretched fiber.

Means to Solve the Problems

The present inventors have conducted extensive and intensive studies with a view toward solving the above-mentioned problems. As a result, it has been found that a polyacetal stretched fiber obtained by stretching a fiber at a temperature which is 100° C. or more to a temperature lower than the melting point of a polyacetal resin composition wherein the fiber is obtained by melt spinning the polyacetal resin composition, and the polyacetal resin composition contains a polyacetal resin and a fatty acid metal salt in a specific amount exhibits an excellent processability in, for example, a stretching step, and the present invention has been completed.

Specifically, the present invention has the following construction.

(1) A polyacetal stretched fiber which is obtained by stretching a fiber at a temperature of 100° C. or more to a temperature lower than the melting point of a polyacetal resin composition, wherein the fiber is obtained by melt spinning the polyacetal resin composition, and the polyacetal resin composition contains a polyacetal resin and a fatty acid metal salt in an amount of 0.01 to 5 phr relative to the polyacetal resin.

(2) The stretched fiber according to item (1), wherein the polyacetal resin composition contains the fatty acid metal salt in an amount of 0.1 to 5 phr relative to the polyacetal resin.

(3) The stretched fiber according to item (1) or (2), wherein the fatty acid metal salt is a salt of a saturated or unsaturated aliphatic carboxylic acid having 12 to 35 carbon atoms with an alkaline earth metal element or amphoteric metal element.

(4) The stretched fiber according to any one of items (1) to (3), wherein the fatty acid metal salt is at least one member selected from the group consisting of calcium stearate, magnesium stearate and zinc stearate.

(5) The stretched fiber according to any one of items (1) to (4), wherein the polyacetal resin composition further contains a fatty acid ester in an amount of 0 to 5 phr relative to the polyacetal resin.

(6) The stretched fiber according to item (5), wherein the fatty acid ester is at least one member selected from the group consisting of an ester of a saturated or unsaturated aliphatic carboxylic acid having 12 to 35 carbon atoms with a saturated or unsaturated aliphatic alcohol having 12 to 35 carbon atoms, and a compound having one or more ester groups, which is derived from a saturated or unsaturated aliphatic carboxylic acid having 12 to 35 carbon atoms with a polyhydric alcohol having 2 to 10 carbon atoms.

(7) The stretched fiber according to item (5) or (6), wherein the fatty acid ester is stearyl stearate.

(8) The stretched fiber according to any one of items (1) to (7), which exhibits a filament tensile strength of 4 g/d or more.

(9) A fiber assembly comprising the stretched fiber according to any one of items (1) to (8).

(10) The fiber assembly according to item (9), which is a twisted yarn, a string, a cord, a rope, a braid, a knitted braid, a net, a woven material, a knitted material, or a nonwoven fabric.

(11) A sliding component comprising the fiber assembly according to item (9) or (10).

(12) A method for producing the stretched fiber according to any one of items (1) to (8), the method comprising: (step 1) melt spinning a polyacetal resin composition containing a polyacetal resin and a fatty acid metal salt in an amount of 0.01 to 5 phr relative to the polyacetal resin to obtain a fiber, and (step 2) stretching the fiber obtained in the step 1 at a temperature of 100° C. or more to a temperature lower than the melting point of the polyacetal resin composition to obtain a stretched fiber.

(13) A method for producing a fiber assembly comprising a stretched fiber, the method comprising: secondary processing the stretched fiber obtained by the method according to item (12) using a twisting machine, a weaving machine, a knitting machine, a braiding machine, a twister, or a rope producing machine.

Effect of the Invention

In the present invention, there are provided a polyacetal stretched fiber having a mechanical strength, particularly a practical tensile strength, and excellent processability in, for example, a stretching step, and an excellent sliding property, and a fiber assembly comprising the stretched fiber.

BEST MODE FOR CARRYING OUT THE INVENTION

Hereinbelow, the polyacetal stretched fiber of the present invention and the fiber assembly comprising the same will be described. The polyacetal stretched fiber of the present invention is obtained by subjecting a fiber to specific stretching processing wherein the fiber is obtained by melt spinning a polyacetal resin composition containing a polyacetal resin and a fatty acid metal salt in a specific amount. In the present invention, the expression "having excellent processability in, for example, a stretching step" indicates that a high take-off speed can be achieved in the melt spinning for the polyacetal resin composition, and further, even when the stretch ratio is high in the stretching step, the obtained stretched fiber has excellent fiber appearance.

Polyacetal resins include polyacetal resin homopolymers and polyacetal resin copolymers, and copolymers are preferred. Polyacetal copolymers can be used individually, or polyacetal copolymers having different types and components of comonomers can be used in combination. The polyacetal copolymer has, in the molecule thereof, in addition to oxymethylene units, an oxyalkylene unit represented by the following formula (1):

[Chemical formula 1]

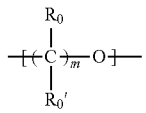

wherein $R_0$ and $R_0'$ are the same or different, and a hydrogen atom, an alkyl group, a phenyl group, or an alkyl group which is interrupted by one or more ether linkages, and m represents an integer of 2 to 6.

The alkyl group is an unsubstituted or substituted, linear or branched alkyl group having 1 to 20 carbon atoms, preferably a linear or branched alkyl group having 1 to 4 carbon atoms. The alkyl group includes methyl, ethyl, n-propyl, i-propyl, n-butyl, i-butyl, t-butyl, pentyl, hexyl, decyl, dodecyl, octadecyl and the like.

Substituents include a hydroxyl group, an amino group, an alkoxy group, an alkenyloxymethyl group, and halogens. Here, the alkoxy group includes methoxy, ethoxy, propoxy and the like. The alkenyloxymethyl group includes allyloxymethyl and the like.

The phenyl group is an unsubstituted phenyl group, or a phenyl group substituted with an unsubstituted or substituted alkyl group, an unsubstituted or substituted aryl group, or a halogen. Here, the aryl group includes phenyl, naphthyl, and anthracyl and the like.

The alkyl group which is interrupted by one or more ether linkages includes a group represented by the following formula (2):

wherein $R_1$ represents an alkylene group, p represents an integer of 0 to 20, and $R_2$ represents a hydrogen atom, an alkyl group, a phenyl group, or a glycidyl group, and the $(R_1-O)$ units may be the same or different.

The alkylene group is a linear or branched, unsubstituted or substituted alkylene group having 2 to 20 carbon atoms, and includes ethylene, propylene, butylene, 2-ethylhexylene and the like. The alkylene as $R_1$ is preferably ethylene or propylene.

It is preferred that $R_0$ and $R_0'$ are the same and a hydrogen atom.

The oxyalkylene unit represented by the formula (1) includes oxyethylene unit, oxypropylene unit, oxybutylene unit, oxypentylene unit, and oxyhexylene unit. Oxyethylene unit, oxypropylene unit, and oxybutylene unit are preferred, and oxydimethylene units, oxytrimethylene units, and oxytetramethylene units are more preferred.

The polyacetal copolymer can further have a unit represented by the following formula (3):

wherein $R_3$ is a group represented by the following formula (4):

wherein $R_4$ represents a hydrogen atom, an alkyl group, an alkenyl group, a phenyl group, or a phenylalkyl group, and $R_1$ and p are as defined for the formula (2).

The alkenyl group is a linear or branched, unsubstituted or substituted alkenyl group having 2 to 20 carbon atoms, and includes vinyl, allyl, and 3-butenyl and the like.

An alkyl portion and phenyl portion in the phenylalkyl group include the above-mentioned examples of the alkyl group and phenyl group. The phenylalkyl group includes benzyl, phenylethyl, phenylbutyl, 2-methoxybenzyl, 4-methoxybenzyl, 4-(allyloxymethyl)benzyl and the like.

In the present invention, when an alkenyl group or a glycidyl group is present in the group represented by the formula (2), or an alkenyl group is present in the group represented by the formula (4), such an alkenyl group or glycidyl group can cause a crosslinking point in a polymerization reaction which possibly further occurs, forming a crosslinked structure.

With respect to the method for producing a polyacetal copolymer, there is no particular limitation. However, the method for producing a polyacetal copolymer includes, for example, a method in which trioxane which is a trimer of formaldhyde, and a comonomer are subjected to bulk polymerization, if necessary, using a cationic polymerization catalyst, such as boron trifluoride.

The comonomer includes cyclic ether having 2 to 8 carbon atoms, such as ethylene oxide, 1,3-dioxolane, 1,3,5-trioxepane, and 1,3,6-trioxocane; and cyclic formal having 2 to 8 carbon atoms, such as cyclic formal of glycol, and cyclic formal of diglycol. These comonomers form the oxyalkylene unit represented by the formula (1) wherein $R_0$ and $R_0'$ are the same and a hydrogen atom.

In the present invention, the polyacetal copolymer includes binary copolymers and multicomponent copolymers. Therefore, as the polyacetal copolymer in the present invention, for example, a polyacetal copolymer having the oxymethylene unit and the oxyalkylene unit represented by the above-mentioned formula (1), a polyacetal copolymer having the oxymethylene unit, the oxyalkylene unit represented by the above-mentioned formula (1), and the unit represented by the formula (3), and these copolymers further having a crosslinked structure can be widely used. In the present invention, the unit represented by the formula (1) wherein $R_0$ and $R_0'$ are not a hydrogen atom simultaneously can be formed by, for example, copolymerizing a glycidyl ether compound and/or an epoxy compound, and the unit represented by the formula (3) can be formed by, for example, copolymerizing an allyl ether compound.

With respect to the glycidyl ether and epoxy compound, there is no particular limitation. The glycidyl ether and epoxy compound include epichlorohydrin; alkylglycidyl formals, such as methylglycidyl formal, ethylglycidyl formal, propylglycidyl formal, and butylglycidyl formal; diglycidyl ethers, such as ethylene glycol diglycidyl ether, propylene glycol diglycidyl ether, 1,4-butanediol diglycidyl ether, hexamethylene glycol diglycidyl ether, resolcinol diglycidyl ether, bisphenol A diglycidyl ether, hydroquinone diglycidyl ether, polyethylene glycol diglycidyl ether, polypropylene glycol diglycidyl ether, and polybutylene glycol diglycidyl ether; triglycidyl ethers, such as glycerol triglycidyl ether and trimethylolpropane triglycidyl ether, and tetraglycidyl ethers, such as pentaerythritol tetraglycidyl ether.

The allyl ether compound includes polyethylene glycol allyl ether, methoxypolyethylene glycol allyl ether, polyethylene glycol-polypropylene glycol allyl ether, polypropylene glycol allyl ether, butoxypolyethylene glycol-polypropylene glycol allyl ether, polypropylene glycol diallyl ether, phenyl ethyl allyl ether, phenyl butyl allyl ether, 4-methoxybenzyl allyl ether, 2-methoxybenzyl allyl ether, and 1,4-diallyloxymethylbenzene.

Especially, from the viewpoint of the mass-productivity and heat stability, preferred is a polyacetal copolymer obtained by adding, relative to 100 parts by weight of trioxane, 0.5 to 30 parts by weight, preferably 1.0 to 15 parts by weight of a comonomer other than trioxane, consisting of one or two or more cyclic ether and/or cyclic formal. When the amount of the comonomer is 0.5 part by weight or more, the resultant polyacetal copolymer has satisfactory heat resistance required in the melt spinning such that the polyacetal copolymer is unlikely to suffer decomposition or foaming inside the extruder or at the residence portion in the spinning nozzle, thus achieving excellent processability. When the amount of the comonomer is 30 parts by weight or less, the yield for the production of the polyacetal copolymer is improved. With respect to each of the amounts of the glycidyl ether compound and epoxy compound and/or allyl ether compound, there is no particular limitation. However, it is preferred that, relative to 100 parts by weight of trioxane, 0.005 to 20 parts by weight of each of the glycidyl ether compound and epoxy compound and/or allyl ether compound can be added.

It is preferred that the polyacetal resin used in the present invention has an MVR (melt volume rate) of 100 $cm^3/10$ minutes or less, as measured in accordance with ISO 1133. A resin having a larger MVR is suitable for forming a thin fiber by melt spinning. However, a resin having an MVR of 100 $cm^3/10$ minutes or less has an advantage in that a fiber formed from the resin exhibits excellent mechanical properties (particularly, an excellent toughness). The MVR can be controlled by appropriately changing the amount of the chain transfer agent used in the polymerization reaction.

The chain transfer agent includes carboxylic acids, carboxylic anhydrides, esters, amides, imides, phenols, acetal compounds and the like. Of these, phenol, 2,6-dimethylphenol, methylal, and polyacetal dimethoxide are preferred, and methylal is more preferred. A solvent includes aliphatic hydrocarbons, such as hexane, heptane, and cyclohexane; aromatic hydrocarbons, such as benzene, toluene, and xylene; and halogenated hydrocarbons, such as methylene dichloride and ethylene dichloride and the like. The chain transfer agent can be used as such, or in the form of a solution of the agent dissolved in the solvent. When the chain transfer agent is methylal, the amount of methylal added can be generally in the range of less than $2 \times 10^{-1}$ wt %/o, based on the weight of trioxane.

A commercially available product of the polyacetal resin includes "Iupital F20-03" and "Iupital F40-03" (manufactured by Mitsubishi Engineering-Plastics Corporation).

With respect to the fatty acid metal salt used in the present invention, there is no particular limitation. However, the fatty acid metal salt includes a salt of a saturated or unsaturated aliphatic carboxylic acid having 12 to 35 carbon atoms with a metal element.

The metal element includes alkaline earth metal element, amphoteric metal element, alkali metal element, and transition metal element. The alkaline earth metal element includes magnesium, calcium, barium, and strontium. The amphoteric metal element includes zinc, aluminum and the like. The alkali metal includes lithium, potassium and the like. The transition metal element includes iron, copper, nickel, manganese and the like.

With respect to the saturated or unsaturated aliphatic carboxylic acid having 12 to 35 carbon atoms, there is no particular limitation. However, lauric acid, palmitic acid, stearic acid, behenic acid, montanic acid, 12-hydroxystearic acid, oleic acid, erucic acid and the like are preferred.

With respect to the fatty acid metal salt, salts of a saturated or unsaturated aliphatic carboxylic acid having 12 to 35 carbon atoms with an alkaline earth metal element or amphoteric metal element are preferred, and calcium stearate, magnesium stearate, and zinc stearate are more preferred.

The amount of the fatty acid metal salt contained in the polyacetal resin composition is 0.01 to 5 phr, preferably 0.1 to 5 phr, more preferably 0.5 to 4 phr, relative to the polyacetal resin. When the amount of the fatty acid metal salt is 0.01 phr or more, a stretched fiber having an excellent processability in, for example, a stretching step can be obtained. Specifically, in the stretching at a temperature which is 100° C. or more and lower than the melting point of the polyacetal resin, while suppressing appearance deterioration of the resultant fiber, such as whitening due to fibrillation or fuzzing due to fiber breaking, the resin can be processed at a high stretch ratio without suffering fiber breaking, so that it becomes possible to obtain a stretched fiber having a practically satisfactory mechanical property and an excellent coefficient of dynamic friction and coefficient of static friction. Further, in the melt spinning, the take-off speed is improved to suppress the occurrence of fiber breaking, so that an excellent stringiness is achieved. When the amount of the fatty acid metal salt is 5 phr or less, the fatty acid metal salt is unlikely to bleed into the surface of the polyacetal resin composition, so that the resultant fiber is prevented from suffering appearance deterioration. Here, "phr" means an amount contained relative to 100 parts of the resin.

The addition of a lubricant or a modifier to a polyacetal resin has been known, and patent document 2 has a description of fatty acid metal salts, such as magnesium stearate and aluminum stearate, as examples of lubricants. However, a polyacetal resin composition using a polyalkylene glycol, a silicone oil, a silicone gum, or a polyethylene wax as a lubricant or a modifier other than the fatty acid metal salt is likely to suffer fiber breaking upon stretching at a temperature of lower than the melting point of the polyacetal resin, and the stretched fiber obtained from such a resin composition becomes poor in the surface appearance due to the progress of fibrillation. Further, the stretched fiber becomes lowered in the sliding properties. Furthermore, the stringiness in the melt spinning step is not improved. In other words, among a number of lubricants, only the fatty acid metal salt is advantageous not only in that when a fiber, which is obtained by melt spinning the polyacetal resin composition containing a fatty acid metal salt, is subjected to stretching at a temperature lower than the melting point of the polyacetal resin composition, the obtained stretched fiber has excellent fiber appearance. Further, when the stretching is performed at high stretch ratio, the obtained stretched fiber has further excellent tensile strength.

The polyacetal resin composition can further contain a fatty acid ester. With respect to the fatty acid ester, there is no particular limitation. However, the fatty acid ester includes an ester of a saturated or unsaturated aliphatic carboxylic acid having 12 to 35 carbon atoms with a saturated or unsaturated aliphatic alcohol having 12 to 35 carbon atoms, such as stearyl stearate, and a compound having one or more ester groups, which are derived from a saturated or unsaturated aliphatic carboxylic acid having 12 to 35 carbon atoms with a polyhydric alcohol having 2 to 10 carbon atoms. As the polyhydric alcohol, glycerol, diglycerol, pentaerythritol, sorbitan, ethylene glycol, diethylene glycol, trimethylolmethane, and triethylolmethane are suitable, and, as the saturated or unsaturated aliphatic carboxylic acid having 12 to 35 carbon atoms, for example, behenic acid, cerotic acid, montanic acid, and lacceric acid are suitable.

The amount of the fatty acid ester contained in the polyacetal resin composition is preferably 0 to 5 phr relative to the polyacetal resin. When the amount of the fatty acid ester is 5 phr or less, the fatty acid ester is unlikely to bleed into the surface of the polyacetal resin composition, so that the resultant fiber is prevented from suffering appearance deterioration.

In the polyacetal resin composition, a known additive and/or filler can be added in such an amount that the effects aimed at by the present invention are not sacrificed. The additive includes, for example, a crystal nucleating agent, an antioxidant, a plasticizer, a matting agent, a foaming agent, a lubricant, a release agent, an antistatic agent, an ultraviolet light absorbing agent, a light stabilizer, a heat stabilizer, a deodorant, a flame retardant, a sliding agent, a perfume, and an anti-fungus agent. The filler includes glass fibers, talc, mica, calcium carbonate, potassium titanate whisker and the like. Further, a pigment or a dye can be added to the composition to achieve finish of a desired color. Further, a transesterification catalyst, various types of monomers, a coupling agent (such as another multifunctional isocyanate compound, epoxy compound, glycidyl compound, or diaryl carbonate), a terminal treatment agent, another resin, or an organic filler which has naturally occurred, such as woodmeal or starch, can be added to the resin composition to modify the resin.

In the present invention, the polyacetal resin composition is obtained by mixing together a polyacetal resin, a fatty acid metal salt, and a further component optionally contained. The polyacetal resin composition in the present invention may be obtained by adding a predetermined fatty acid metal salt and fatty acid ester to a polyacetal resin in a step for melt-kneading, into the crude polyacetal resin deactivated for the polymerization catalyst, an antioxidant, a nitrogen-containing compound, and a stabilizer, such as a hydroxide, an oxide, or an inorganic salt of an alkali or alkaline earth metal, using, for example, a single-screw or twin-screw extruder, or may be obtained by post-addition of a fatty acid metal salt and a fatty acid ester in the form of a compound to a polyacetal resin. Alternatively, the polyacetal resin composition can be obtained by a method in which, upon melt spinning, the polyacetal resin pellets are impregnated with a fatty acid metal salt in a predetermined amount and further a fatty acid ester, or a method of adding a masterbatch prepared by preliminarily adding a predetermined fatty acid metal salt and further a fatty acid ester to a polyacetal resin and another resin at a high concentration.

<Method for Producing a Polyacetal Stretched Fiber>

The method for producing a polyacetal stretched fiber of the present invention comprises the steps of: (step 1) melt spinning a polyacetal resin composition containing a polyacetal resin and a fatty acid metal salt in an amount of 0.01 to 5 phr relative to the polyacetal resin to obtain a fiber; and (step 2) stretching the fiber obtained in step 1 at a temperature of 100° C. or more to a temperature lower than the melting point of the polyacetal resin composition to obtain a stretched fiber.

Step 1 is a step for melt spinning of a polyacetal resin composition containing a polyacetal resin and a fatty acid metal salt in an amount of 0.01 to 5 phr relative to the polyacetal resin to obtain a fiber.

With respect to a condition for the melt spinning, there is no particular limitation as long as the conditions are those under which a fiber can be obtained from the polyacetal resin composition. For example, the condition for the melt spinning includes a condition in which the polyacetal resin composition in a fiber form is taken off while heating the temperature of the spinning nozzle of the melt spinning apparatus to the melting point of the polyacetal resin composition to 250° C. The melt spinning apparatus includes an apparatus for multifilament or monofilament comprising a general single-screw extruder, a gear pump, a screen, and a die.

In step 1, the fiber by melt spinning of the polyacetal resin composition is obtained.

Step 2 is a step for stretching the fiber obtained in step 1 at a temperature of 100° C. or more to a temperature lower than the melting point of the polyacetal resin composition to obtain a stretched fiber.

With respect to the method for stretching, there is no particular limitation as long as the stretched fiber obtained by the stretching method can exhibit a practically satisfactory tensile strength. However, the method for stretching includes a method in which the fiber is unwound from the roll and wound round a wind-up roll while heating, wherein the speed ratio between the unwind roll and the wind-up roll is appropriately set. Further, the step for solidifying the resin into a fiber form may comprise the stretching step. For example, there may be mentioned a step in which the fiber upon melt spinning is wound at a high speed, and a step in which the molten resin is blown into a fiber form using an air stream at a high temperature and at a high speed. That is, step 1 and step 2 can be performed at single stage.

The heating temperature in the stretching step is 100° C. or more to a temperature lower than the melting point of the polyacetal resin composition, preferably 120° C. or more to a temperature lower than the melting point of the polyacetal resin composition, more preferably from a temperature "10° C. lower than the melting point of the polyacetal resin composition" to a temperature lower than the melting point of the polyacetal resin composition. When the heating temperature is lower than 100° C., which is even lower than the melting point of the polyacetal resin composition, such a heating temperature is so low that fiber breaking frequently occurs, making it impossible to achieve a high stretch ratio. Further, the resultant fiber has poor appearance, or a structural defect is caused inside the fiber, so that a high tensile strength cannot be obtained. On the other hand, when the heating temperature is the melting point of the polyacetal resin composition or more, the unstretched fiber is molten upon heating to cause fiber breaking, or the orientation of polymer chains does not proceed during the stretching, and hence no tension is exerted to the fiber, so that it is impossible to obtain a high tensile strength. The melting point of the polyacetal resin composition in the present invention is 140 to 180° C., preferably 150 to 175° C.

When the fiber has a low tensile strength, there is a possibility that the fiber suffers breaking or deformation during the fabrication because of the low strength of the fiber, or that the fiber assembly obtained by secondary processing has so low strength that the material cannot be brought into a practical use. Therefore, the filament tensile strength is preferably 1.5 g/d or more, more preferably 4 g/d or more.

With respect to the stretch ratio for the fiber, there is no particular limitation as long as a stretched fiber having a desired tensile strength can be obtained. However, for example, the stretch ratio can be 2 to 10 times, preferably 3 to 8 times. The stretch ratio can be calculated from the unwind speed for the unstretched fiber and the wind speed for the stretched fiber.

In step 2, the polyacetal stretched fiber of the present invention is obtained.

In the present invention, the polyacetal resin composition contains a fatty acid metal salt in a specific amount, and, by virtue of this, the present invention has advantages not only in that the stringiness during the melt spinning is excellent, but also in that, in the subsequent stretching of the polyacetal resin composition at a temperature which is 100° C. or more and lower than the melting point of the polyacetal resin composition, processing at a high stretch ratio can be made while suppressing the occurrence of whitening due to fibrillation, fuzzing due to fiber breaking, or fiber breaking, so that it becomes possible to obtain high tensile strength and excellent sliding properties without markedly lowing the surface smoothness of the fiber. Accordingly, the polyacetal stretched fiber obtained by the present invention has a practically satisfactorily high tensile strength and excellent sliding properties, and therefore is advantageously used in the application where the fiber is needed to endure a certain tension and to have excellent sliding properties such that no friction or wear is caused with a guide, and the fiber must be subjected to secondary process using, for example, a twisting machine, a weaving machine, a knitting machine, a braiding machine, a twister, or a rope producing machine.

The fiber assembly of the present invention is a fiber assembly comprising the stretched fiber of the present invention as a main constituent. The fiber assembly is not limited, and includes a twisted yarn, a string, a cord, a rope, a braid, a knitted braid, a net, a woven material, a knitted material, and a nonwoven fabric, each of which is obtained by subjecting a multifilament or monofilament of the stretched fiber to the above-mentioned secondary process and the like. Further, the fiber assembly includes a material obtained by a method in which a composite fiber having a core (high melting point)-shell (low melting point) structure is obtained from the polyacetal resin compositions having different melting points, and subjected to heat fusion. Thus, a method for producing the stretched fiber assembly of the present invention comprises: secondary processing the stretched fiber obtained by the method of the present invention using a twisting machine, a weaving machine, a knitting machine, a braiding machine, a twister, or a rope producing machine.

The sliding component of the present invention indicates a sliding part comprising the fiber assembly consisting of the polyacetal fiber, which part is to be in contact with, for example, a polyacetal resin or another resin, or a metal, or a part of the sliding part. The sliding component includes, for example, various bearing materials, such as a gland packing, pad materials for an audio tape or video tape, and an automobile window stabilizer and stabilizing bush. Further, the fiber assembly of the stretched fiber of the present invention has an excellent sliding property, and therefore is expected to have an advantageous feature that it is unlikely to damage the material with which the fiber assembly is in contact, and hence the fiber assembly can be applied to, for example, a wiping cloth and a protecting cloth.

EXAMPLES

Hereinbelow, the present invention will be described in more detail with reference to the following Examples and Comparative Examples, which should not be construed as limiting the scope of the present invention.

Examples and Comparative Examples

Materials

Polyacetal Resin

Acetal copolymer obtained by copolymerizing trioxane and 1,3-dioxolane (comonomer) in an amount of 4% by mass, based on the mass of trioxane: Iupital F20-03 (POM- 1) and F40-03 (POM-2), manufactured by Mitsubishi Engineering-Plastics Corporation, were used. These polyacetal resins respectively have different MVRs due to different amounts of the chain transfer agent used in the polymerization reaction.

Fatty Acid Metal Salt

Calcium stearate (a-1), magnesium stearate (a-2), and zinc stearate (a-3) were used.

Fatty Acid Ester

Stearyl stearate (b-1) was used.

Others

For comparison, the following additives were used.

Silicone gum (c-1); dynamic viscosity at 25° C.: $100 \times 10^4$ cSt (polydimethylsiloxane; trade name: KF-96H-1,000,000CS, manufactured by Shin-Etsu Chemical Co., Ltd.)

Polyethylene wax (c-2 and c-3); trade name: Hi-wax 405MP (molecular weight: 4,000) and 720P (molecular weight: 7,200), manufactured by Mitsui Chemicals, Inc.

Silicone oil (c-4); dynamic viscosity at 25° C.: $3 \times 10^4$ cSt (polydimethylsiloxane; trade name: KF-96H-30,000 cs, manufactured by Shin-Etsu Chemical Co., Ltd.)

Polyethylene glycol (c-5); PEG 20000P, manufactured by Sanyo Chemical Industries, Ltd.

Further, a tetrafluoroethylene-perfluoroalkyl vinyl ether copolymer (PFA) fiber (48 filaments, each filament having a size of 6 d), manufactured by Daikin Industries, Ltd., which is a general sliding material, was used for comparison.

<Preparation of a Polyacetal Resin Composition>

The polyacetal resin and an additive, such as a fatty acid metal salt, were mixed together, and preliminarily melt-kneaded by means of a twin-screw extruder having a bore diameter of 30 mm.

<Melt Spinning>

In melt spinning, the temperature of the cylinder and nozzle portion was increased to 200° C., and the polyacetal resin composition was discharged at 1.2 kg/h through a nozzle having 48 holes, each hole having a diameter of 0.6 mm. In this spinning, the maximum take-off speed at which fiber breaking occurred was determined, and used as an index of the spinning processability.

Then, the take-off speed was fixed at 100 m/minute and the unstretched fiber was continuously taken, and introduced to the subsequent step for heating stretching, where the fiber was stretched at a stretch ratio of 3 to 6 times at a roll temperature of 100 to 120° C., to prepare a multifilament having a size of about 288 d and comprising 48 filaments, each filament having a size of about 6 d.

<Appearance>

With respect to the polyacetal fiber obtained after stretching, the appearance was visually observed, and evaluated in accordance with the criteria: fuzzing (x), whitening (Δ), caused due to fibrillation, and excellent (○).

<Tensile Test>

A chuck for fiber was fitted to a bench-type precision universal testing machine Autograph AGS-X, manufactured by Shimadzu Corporation, and a tensile test was performed in accordance with JIS L 1013 to measure a stress (tensile strength) and elongation at break.

<Preparation of a Circular Knitted Sample>

Each multifilament was subjected to circular knitting using a knitting tester (model CSK-7; 3½ diameter, 220 nails), manufactured by Koike Kikai Seisakusho Co., Ltd., and the resultant knitted material was cut into 4×8 cm and fixed to a plastic sheet using an adhesive double coated tape, and subjected to the sliding test described below.

<Sliding Test>

Friction Tester (KES-SE), manufactured by Kato Tech Co., Ltd., was used in the test, and the probe was 10×10 mm which is the manufacturer's standard, 20 piano wires of φ 0.5 mm were arranged in parallel to one another, and the vertical load was 50 g. From the test, a coefficient of static friction and a coefficient of dynamic friction were determined.

As seen from Table 1, in Examples 1 to 8 in which a fiber was obtained by melt spinning the polyacetal resin composition containing a fatty acid metal salt, not only was the take-off speed improved to enable the production at a higher rate, but also a thin fiber could be continuously obtained. Further, it was possible to obtain a stretched fiber having a high stretch ratio and excellent appearance. Thus, the stretched fiber of the present invention had excellent processability in, for example, a stretching step. Further, it was found that a fiber assembly comprising the obtained polyacetal stretched fiber had a practically high tensile strength and a low elongation, and further exhibited a low coefficient of static friction and a low coefficient of dynamic friction which are comparable to those of the PFA fiber. In addition, Examples 1 to 5, 7, and 8 having high stretch ratio had a low elongation and a high tensile strength, as compared to Comparative Examples 2 to 4 having the same stretch ratio. By contrast, in Comparative Examples 1 to 3 in which no fatty acid metal salt was contained, and in Comparative Example 4 in which the amount of the fatty acid metal salt contained was low, the take-off speed was not satisfactory and the stretched fiber had poor appearance, and the processability in, for example, a stretching step was poor. Further, in Comparative Examples 5 to 10 in which a lubricant or a modifier other than the fatty acid metal salt was contained, the take-off speed was not satisfactory and the stretched fiber had poor appearance, and a low elongation was not

TABLE 1

| | | Resin | Additive X( ) The figures in parentheses indicate an amount [phr]. | | Maximum take-off speed [m/min.] | Stretch ratio [Times] | Fiber appearance | Tensile strength [g/d] | Elongation [%] | Coefficient of static friction | Coefficient of dynamic friction |
|---|---|---|---|---|---|---|---|---|---|---|---|
| Example | 1 | POM-1 | a-1 (0.5) | | 260 | 6 | ○ | 5.9 | 19 | 0.13 | 0.12 |
| | 2 | POM-1 | a-1 (1.0) | | 300 | 6 | ○ | 6.2 | 20 | 0.12 | 0.11 |
| | 3 | POM-1 | a-1 (3.0) | | 320 | 6 | ○ | 6.1 | 17 | 0.10 | 0.10 |
| | 4 | POM-1 | a-2 (1.0) | | 300 | 6 | ○ | 6.1 | 18 | 0.11 | 0.11 |
| | 5 | POM-1 | a-3 (1.0) | | 300 | 6 | ○ | 6.2 | 16 | 0.12 | 0.11 |
| | 6 | POM-1 | a-1 (1.0) | b-1 (1.0) | 300 | 3 | ○ | 1.7 | 16 | 0.11 | 0.09 |
| | 7 | POM-1 | a-1 (1.0) | b-1 (1.0) | 300 | 6 | ○ | 6.3 | 18 | 0.11 | 0.08 |
| | 8 | POM-2 | a-1 (1.0) | b-1 (1.0) | 850 | 6 | ○ | 6.1 | 16 | 0.11 | 0.09 |
| Comparative Example | 1 | POM-1 | — | — | 120 | 3 | Δ | 3.7 | 20 | 0.11 | 0.09 |
| | 2 | POM-1 | — | — | 120 | 6 | Δ | 5.7 | 21 | 0.19 | 0.14 |
| | 3 | POM-2 | — | — | 500 | 6 | Δ | 5.5 | 19 | 0.21 | 0.14 |

TABLE 1-continued

| | | | | | | | | | | | | |
|---|---|---|---|---|---|---|---|---|---|---|---|---|
| 4 | POM-1 | a-1 (0.005) | | | | 120 | 6 | Δ | 5.6 | 20 | 0.21 | 0.13 |
| 5 | POM-1 | — | c-1 (1.0) | c-2 (0.7) | c-3 (0.8) | 120 | 3 | Δ~x | 2.4 | 27 | 0.12 | 0.10 |
| 6 | POM-1 | — | c-1 (1.0) | | | 120 | 3 | Δ | 1.9 | 21 | 0.13 | 0.11 |
| 7 | POM-1 | — | c-2 (1.0) | | | 120 | 3 | Δ | 2.1 | 22 | 0.13 | 0.12 |
| 8 | POM-1 | — | c-3 (1.0) | | | 120 | 3 | Δ | 2.2 | 24 | 0.12 | 0.13 |
| 9 | POM-1 | — | c-4 (1.0) | | | 120 | 3 | x | — | — | 0.16 | 0.12 |
| 10 | POM-1 | — | c-5 (3.0) | | | 150 | 6 | Δ | 2.0 | 29 | 0.21 | 0.18 |
| 11 | PFA | — | | | | | | ○ | 1.0 | 45 | 0.12 | 0.11 |

| | | |
|---|---|---|
| Polyacetal | POM-1 | MVR = 8 [cm³/10 minutes] Iupital F20-03, manufactured by Mitsubishi Engineering-Plastics Corporation |
| | POM-2 | MVR = 45 [cm³/10 minutes] Iupital F40-03, manufactured by Mitsubishi Engineering-Plastics Corporation |
| Another resin | PFA | Hastec PFA (48 filaments, each filament having a size of 6 d) |
| | | ·X·Tetrafluoroethylene-perfluoroalkyl vinyl ether copolymer (PFA) fiber, manufactured by Daikin Industries, Ltd., was used as such. |
| Additives | a-1 | Calcium stearate |
| | a-2 | Magnesium stearate |
| | a-3 | Zinc stearate |
| | b-1 | Stearyl stearate |
| | c-1 | Silicone gum |
| | c-2 | Hi-wax 720 P, manufactured by Mitsui Chemicals, Inc. |
| | c-3 | Hi-wax 405 MP, manufactured by Mitsui Chemicals, Inc. |
| | c-4 | Silicone oil |
| | c-5 | Polyethylene glycol (molecular weight: 20,000) |

The invention claimed is:

1. A multifilament of a polyacetal stretched fiber which is obtained by stretching a fiber at a temperature of 100° C. or more to a temperature lower than the melting point of a polyacetal resin composition, wherein the fiber is obtained by melt spinning the polyacetal resin composition, and the polyacetal resin composition contains a polyacetal resin, a fatty acid metal salt in an amount of 0.01 to 3 phr relative to the polyacetal resin, and a fatty acid ester, wherein the fatty acid ester is an ester of a saturated or unsaturated aliphatic carboxylic acid having 12 to 35 carbon atoms with a saturated or unsaturated aliphatic alcohol having 12 to 35 carbon atoms.

2. The multifilament of the stretched fiber according to claim 1, wherein the polyacetal resin composition contains the fatty acid metal salt in an amount of 0.1 to 3 phr relative to the polyacetal resin.

3. The multifilament of the stretched fiber according to claim 1, wherein the fatty acid metal salt is a salt of a saturated or unsaturated aliphatic carboxylic acid having 12 to 35 carbon atoms with an alkaline earth metal element or amphoteric metal element.

4. The multifilament of the stretched fiber according to claim 3, wherein the polyacetal resin composition contains the fatty acid ester in an amount of 1.0 to 5 phr relative to the polyacetal resin.

5. The multifilament of the stretched fiber according to claim 4, wherein the fatty acid ester is stearyl stearate.

6. The multifilament of the stretched fiber according to claim 1, wherein the fatty acid metal salt is at least one member selected from the group consisting of calcium stearate, magnesium stearate and zinc stearate.

7. The multifilament of the stretched fiber according to claim 6, wherein the polyacetal resin composition contains the fatty acid ester in an amount of 1.0 to 5 phr relative to the polyacetal resin.

8. The multifilament of the stretched fiber according to claim 7, wherein the fatty acid ester is stearyl stearate.

9. The multifilament of the stretched fiber according to claim 1, wherein the polyacetal resin composition contains the fatty acid ester in an amount of 1.0 to 5 phr relative to the polyacetal resin.

10. The multifilament of the stretched fiber according to claim 9, wherein the fatty acid ester is stearyl stearate.

11. The multifilament of the stretched fiber according to claim 1, which exhibits a filament tensile strength of 4 g/d or more.

12. A fiber assembly comprising the multifilament of the stretched fiber according to claim 1.

13. The fiber assembly according to claim 12, which is a twisted yarn, a string, a cord, a rope, a braid, a knitted braid, a net, a woven material, a knitted material, or a nonwoven fabric.

14. A sliding component comprising the fiber assembly according to claim 12.

15. A method for producing the multifilament of the stretched fiber according to claim 1, the method comprising:
   melt spinning a polyacetal resin composition containing a polyacetal resin, a fatty acid metal salt in an amount of 0.01 to 3 phr relative to the polyacetal resin, and a fatty acid ester, wherein the fatty acid ester is an ester of a saturated or unsaturated aliphatic carboxylic acid having 12 to 35 carbon atoms with a saturated or unsaturated aliphatic alcohol having 12 to 35 carbon atoms, at a take-off speed of 100 to 850 m/min to obtain a fiber; and
   stretching the obtained fiber at a temperature of 100° C. or more to a temperature lower than the melting point of the polyacetal resin composition to obtain a stretched fiber.

16. A method for producing a fiber assembly comprising a multifilament of a stretched fiber, the method comprising:
   secondary processing the stretched fiber obtained by the method according to claim 15 using a twisting machine, a weaving machine, a knitting machine, a braiding machine, a twister, or a rope producing machine.

* * * * *